United States Patent [19]
Reed

[11] 4,001,510
[45] Jan. 4, 1977

[54] DIGITAL MODULATOR AND DEMODULATOR SYSTEM FOR FDM TELEPHONY

[75] Inventor: Francis Keith Reed, Scottsdale, Ariz.

[73] Assignee: Motorola Inc., Chicago, Ill.

[22] Filed: July 7, 1975

[21] Appl. No.: 593,892

[52] U.S. Cl. .......................................... 179/15 FD
[51] Int. Cl.² ........................................ H04J 1/04
[58] Field of Search ................... 179/15 FD, 15 FS; 325/50, 138, 330

[56] References Cited
UNITED STATES PATENTS

| | | | |
|---|---|---|---|
| 3,605,019 | 9/1971 | Cutter | 325/65 |
| 3,773,979 | 11/1973 | Kirk | 179/15 FD |
| 3,875,340 | 4/1975 | Roy | 179/15 FD |
| 3,912,870 | 10/1975 | Roy | 179/15 FS |

*Primary Examiner*—Kathleen H. Claffy
*Assistant Examiner*—Joseph A. Popek
*Attorney, Agent, or Firm*—M. David Shapiro; Harry M. Weiss; Sang Ki Lee

[57] ABSTRACT

A modulating and demodulating system for converting a plurality of baseband space division signals to a frequency division multiplexed signal. The baseband signals are sequentially sampled and converted in an analog-to-digital converter to a series of digital words. Predetermined mathematical algorithms incorporating digital filters, multipliers and shift registers are used to convert the series of digital words to a frequency division multiplexed digital signal. Aliasing of the baseband signals provides the required dispersion through a predetermined frequency range. A digital to analog converter coupled to a conventional balanced mixer and oscillator is then used to up convert the resulting signal to the desired frequency range. A high pass filter is used to remove the image frequencies. The resulting frequency division multiplexed signal may be transmitted by conventional means to a remote location where demodulation is accomplished essentially by reversal of the modulation process.

15 Claims, 20 Drawing Figures

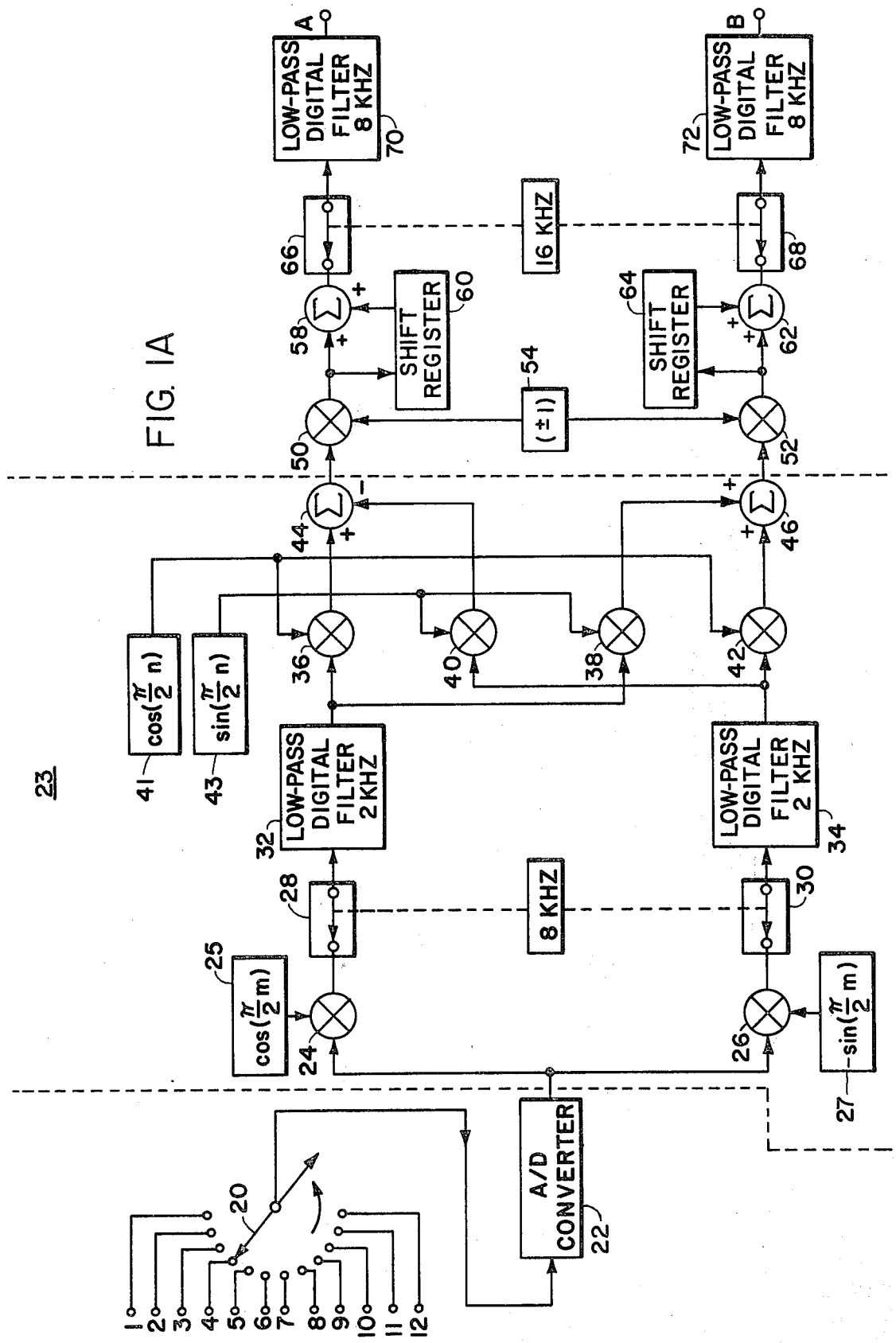
FIG. IA

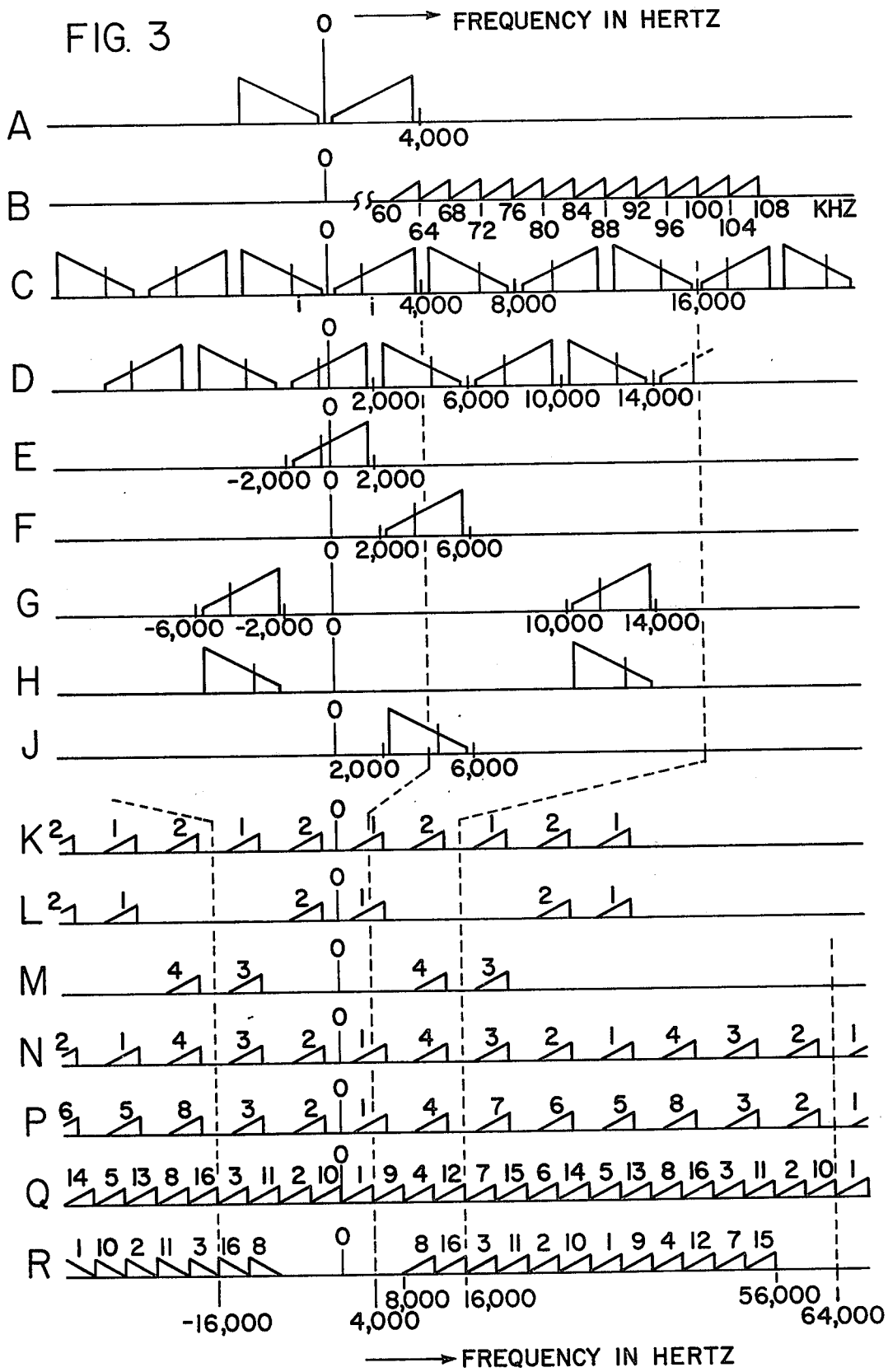

DIGITAL MODULATOR AND DEMODULATOR SYSTEM FOR FDM TELEPHONY

FIELD OF THE INVENTION

This invention relates to modulation and demodulation of multiplexed telephony channels utilizing digital technology.

BACKGROUND OF THE INVENTION

The increasing availability of inexpensive digital integrated circuits is causing a trend toward the use of more and more digital filtering and other types of digital processing. Attempts have been made to realize the relatively complicated telecommunications function using a greater proportion of digital hardware. Historically, digital signal techniques have been used to construct frequency division multiplexed signals where many signals are made to share a common path through the use of single sideband amplitude modulation. In prior art digital systems, the sampling rate required for the highest level of implementation was utilized throughout the system. This meant that the most stringent sampling rate requirements were extended throughout the system even though the balance of the system might not need such a high sampling rate.

SUMMARY OF THE INVENTION

Therefore it is an object of this invention to provide modulation and demodulation sampling rates commensurate with the specific technical requirements for sampling.

Another object of the invention is to produce the modulator and demodulator on inexpensive large scale integrated circuit chips.

Still another object of the invention is to utilize digital arithmetic techniques for modulation and demodulation of multiplexed signal channels.

The foregoing and other objects of the invention are realized by selectively time sharing elements of a data processing circuit to provide various digital filtering, multiplying, and shift register functions. The aliasing phenomena is utilized to provide frequency diverse signals from the space diverse signals which comprise the inputs to the system. The resulting frequency division multiplexed signal may be transmitted by conventional means to a remote location where demodulation is accomplished essentially by reversal of the modulation technique.

The foregoing and other aspects of the present invention will be understood more fully from the following detailed description of an illustrative embodiment of the present invention in conjunction with the accompanying drawings in which:

FIGS. 1(A) and 1(B) show a block diagram of the modulator system.

FIGS. 2(A) and 2(B) show a block diagram of the demodulator system.

FIG. 3 (comprised of 3A - 3R) shows the signal waveforms found at certain points in the block diagram of FIGS. 1(A) and 1(B).

DETAILED DESCRIPTION

Figure 1B:
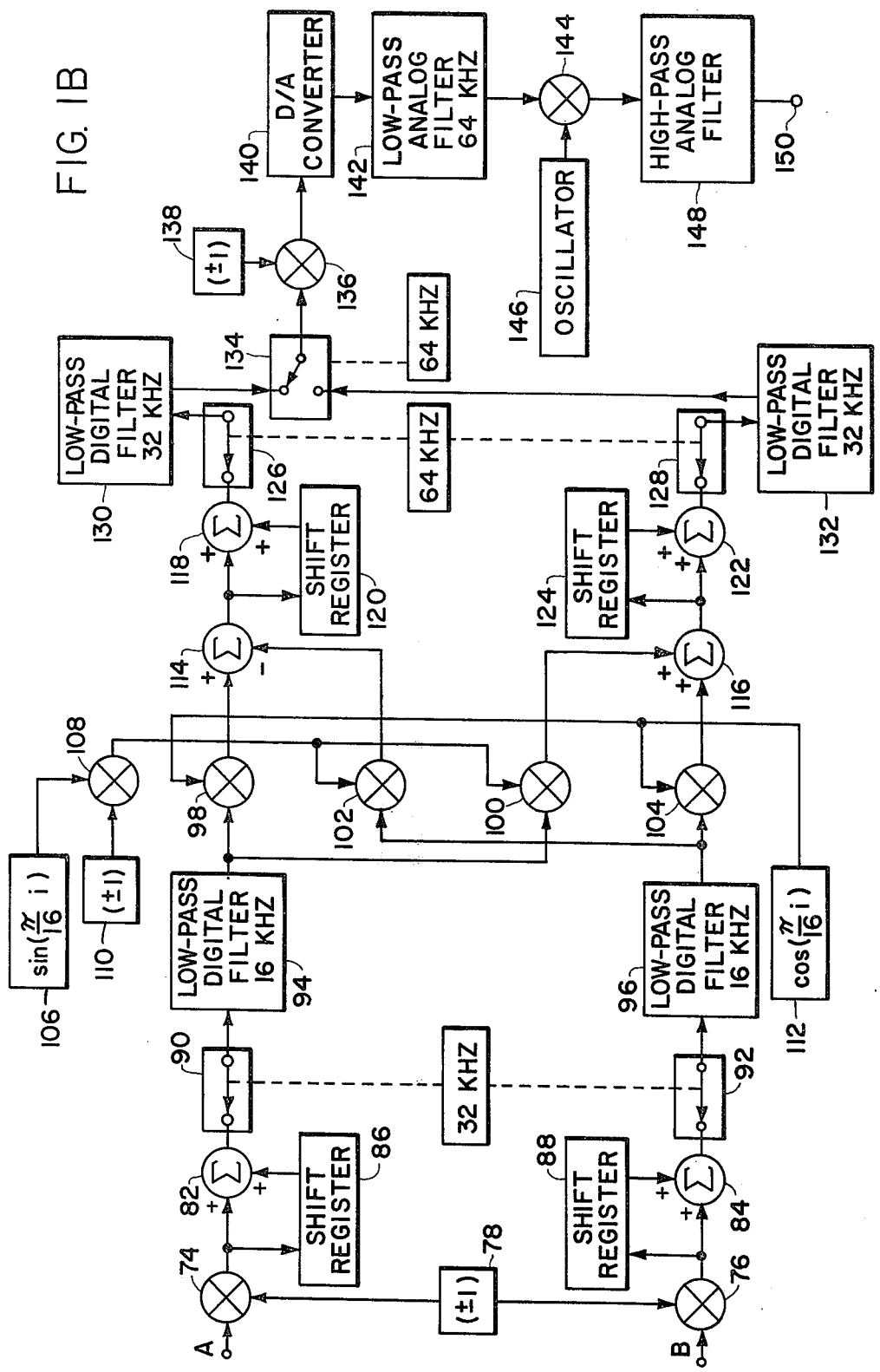

The following is a description of a typical embodiment of the invention. Referring to FIGS. 1(A) and 1(B), 12 channels of baseband information are introduced into the system at terminals 1 through 12. Scanner 20 samples the 12 channels at a rate of 8,000 times per second per channel. Scanner 20 may be of a solid state type well known to one skilled in the art. The output of scanner 20 is fed to an Analog to Digital (A to D) converter 22. A to D converter 22 converts each sample from the scanner to a digital word in real time. The output of A to D converter 22 consists of 8,000 data samples from each of the 12 input channels for each one second of operation. Therefore at the output of A to D converter 22 there are 96,000 data words per second. The data words are fed to multipliers 24, 26. The real part of a complex number is generated at the output of multiplier 24 by multiplying the input data word by the cosine $(\pi/2)m$ where $m$ is an integer which is incremented by one for each scan cycle of scanner 20. The imaginary portion of this same complex number is generated at the output of multiplier 26 as a result of multiplying the input data word by sine $(\pi/2)m$. Switches 28 and 30 are operated in synchronism at a rate of 8000 open-close cycles per second. The operation of switches 28 and 30 are synchronized with the operation of scanner 20 such that the switches 28 and 30 alternately are closed once on each data scan and open once between data scans. The output from switch 28 is fed to a recursive digital low pass filter 32. The output of switch 30 is fed to recursive digital low pass filter 34. Filters 32, 34 have a high frequency cut-off of 2KHz. Descriptions of the digital filters utilized in this invention may be found in "Digital Filter Design Techniques in the Frequency Domain", Proceedings IEEE, Vol. 55:2, February 1967, pp 149–71, by Charles M. Rader and Bernard Gold and Digital Processing of Signals, McGraw-Hill, 1969 by Gold, B. and Rader, C. M. et al.

The output from digital low pass filter 32 is fed to multipliers 36 and 38. The output from digital low pass filter 34 is fed to multipliers 40 and 42. A cosine $(\pi/2)n$ signal is fed to multipliers 36 and 42 while a sine $(\pi/2)n$ is fed to multipliers 38 and 40. The products of multipliers 36 and 40 are combined in adder 44. The product outputs of multipliers 38 and 42 are combined in adder 46.

The sum output of adder 44 is fed to multiplier 50. The sum output of adder 46 is fed to multiplier 52. Plus or minus one generator 54 also feeds multipliers 50 and 52. The output of multiplier 50 feeds adder 58 and to shift register 60. The output of shift register 60 is fed to a second input of adder 58. The output of multiplier 52 is fed to adder 62 and to shift register 64. The output of shift register 64 is fed to a second input of adder 62. The sum output of adder 58 is fed to switch 66 and the sum output of adder 62 is fed to switch 68. Switches 66, 68 are operated in synchronism at a rate of 16,000 open-close cycles per second. The output of switch 66 is fed to low pass digital filter 70 and the output of switch 68 is fed to low pass digital filter 72. Filters 70, 72 have a high frequency cutoff of 8 KHz. The output of digital filter 70 is fed to multiplier 74. The output of digital filter 72 is fed to multiplier 76. Plus or minus one generator 78 feeds multipliers 74, 76. The output of multiplier 74 is fed to adder 82 and to shift register 86. The output of shift register 86 is fed to a second input of adder 82. The output of multiplier 76 is fed to adder 84 and to shift register 88. The output of shift register 88 is fed to a second input of adder 84. The output of adder 82 is fed to switch 90. The output of adder 84 is fed to switch 92. Switches 90, 92 are operated in synchronism at a rate of 32,000 open-close cycles per second. The output of switch 90 is fed to low pass digital filter 94. The output of switch 92 is fed to low pass digital filter 96. Filters 94, 96 have a high frequency cutoff of 16 KHz. The output of digital filter 94 is fed to multipliers 98, 100. The output of digital filter 96 is fed to multipliers 102, 104. Multipliers 100, 102 are also fed from multiplier 108. Multiplier 108 is fed from sine $(\pi/16)i$ generator 106, and from plus or minus one generator 110. Multipliers 98 and 104 are fed from cosine $(\pi/16)i$ generator 112. The outputs of multipliers 98, 102 are fed to adder 114. The outputs of multipliers 100, 104 are fed to adder 116. The difference output of adder 114 is fed to adder 118 and shift register 120. The output of shift register 120 is fed to a second input of adder 118. The sum output of adder 116 is fed to adder 122 and shift register 124. The output of shift register 124 is fed to a second input of adder 122. Adder 118 output is fed to switch 126. Adder 122 output is fed to switch 128. Switches 126, 128 are operated in synchronism at a rate of 64,000 open-close cycles per second. The output of switch 126 is fed to low pass digital filter 130. The output of switch 128 is fed to low pass digital filter 132. Filters 130, 132 have a high frequency cutoff of 32 KHz. The outputs of digital filters 130, 132 are fed to switch 134 which operates at a rate of 64,000 close-close cycles per second. The output of switch 134 is fed to multiplier 136. Plus or minus one generator 138 also feeds multiplier 136. The product output of multiplier 136 feeds D to A converter 140. The output of D to A converter 140 feeds low pass analog filter 142. Filter 142 has a high frequency cutoff of 64 KHz. The output of analog filter 142 feeds mixer 144 which is also fed by oscillator 146. The output of mixer 144 feeds high pass analog filter 148. The output of high pass analog filter 148 is available at terminal 150. This completes the physical description of the modulator.

Figure 2A:
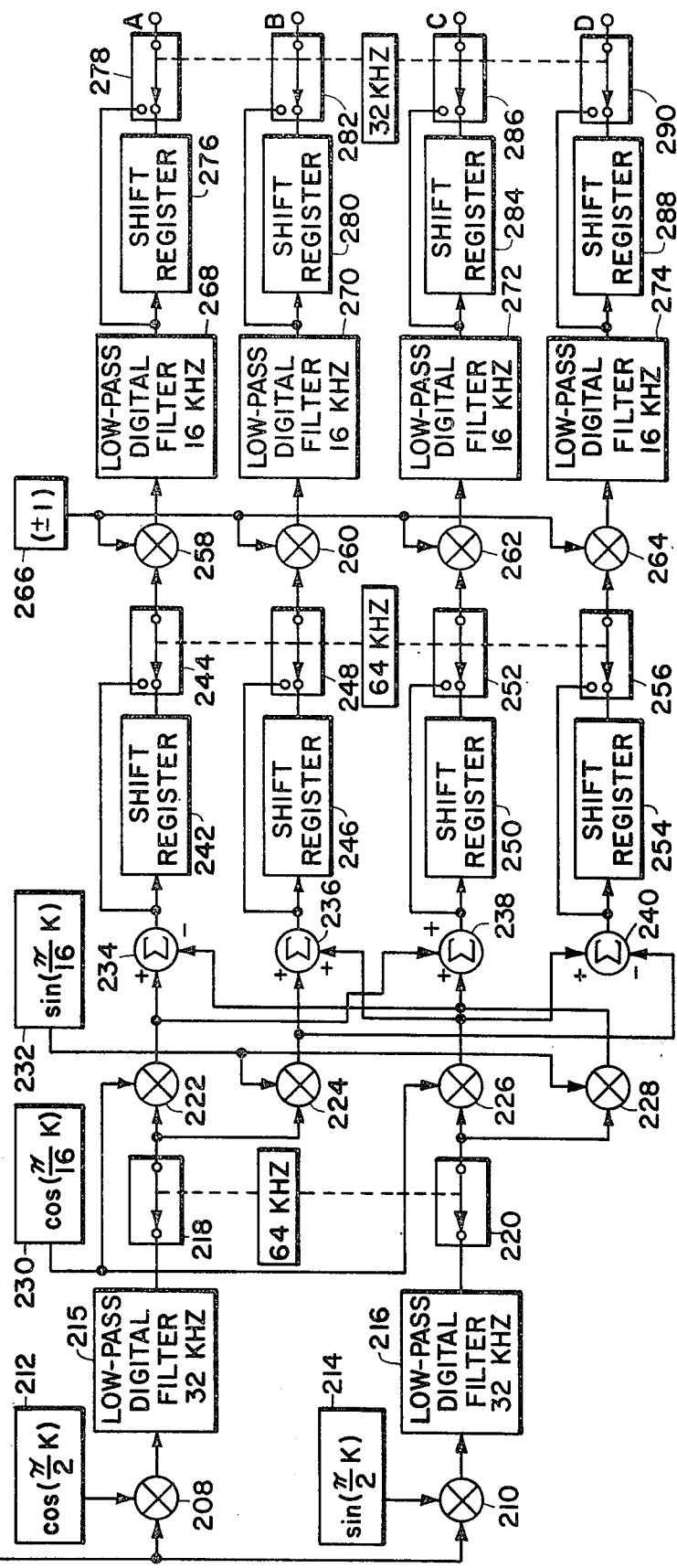
Figure 2B:
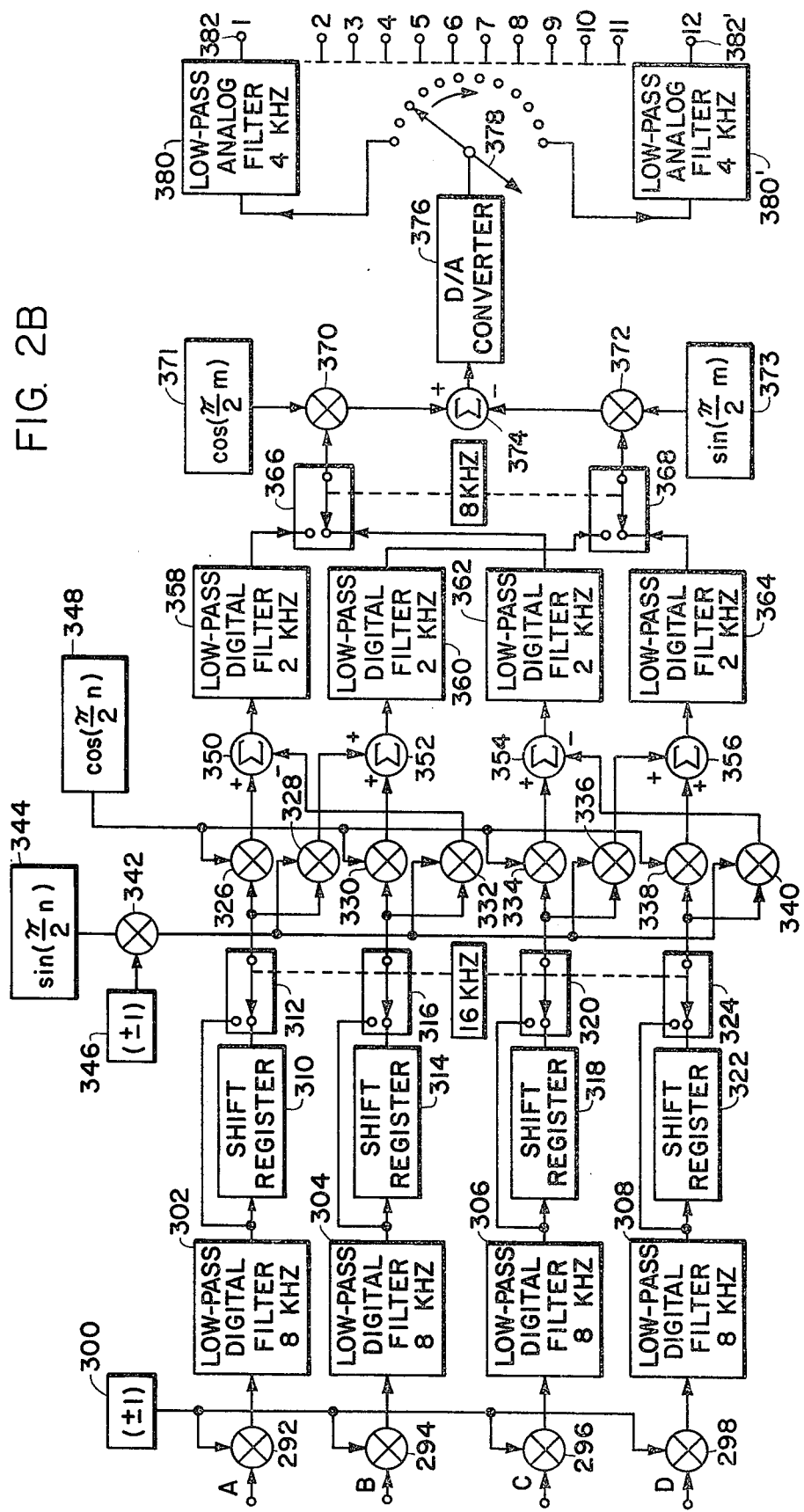

The following is a description of the demodulator portion of the system (see FIGS. 2(A) and 2(B)). Input terminal 200 is fed, for instance, from a telephone cable terminal. Input terminal 200 is fed to mixer 201 which is also fed from oscillator 202. The output of mixer 201 whose spectrum extends from 8 KHz nominal to 56 KHz nominal, is fed to analog low pass filter 204. Filter 204 may have a high frequency cutoff frequency of 64 KHz. The output of low pass filter 204 is fed to A to D converter 206. The output of A to D converter 206 is fed to multipliers 208, 210. Cosine $(\pi/2)k$ generator 212 also feeds multiplier 208. Sine $(\pi/2)k$ generator 214 also feeds multiplier 210. The output of multiplier 208 feeds low pass digital filter 215. The output of multiplier 210 feeds low pass digital filter 216. Filters 215, 216 have a high frequency cutoff of 32 KHz. The output of digital filter 215 feeds switch 218. The output of digital filter 216 feeds switch 220. Switches 218, 220 are operated in synchronism at a rate of 64,000 open-close cycles per second. The output of switch 218 feeds multipliers 222 and 224. The output of switch 220 feeds multipliers 226, 228. Cosine $(\pi/16)k$ generator 230 feeds multipliers 222, 226. Sine $(\pi/16)k$ generator 232 feeds multipliers 224, 228. The output of multiplier 222 feeds adder 234 and adder 238. The output of multiplier 224 feeds adder 236 and adder 240. The output of multiplier 226 feeds adder 236 and adder 240. The output of multiplier 228 feeds adder 234 and adder 238. The difference output of adder 234 is fed to shift register 242 and to switch 244. The output of shift register 242 also feeds switch 244. The sum output of adder 236 feeds shift register 246 and switch 248. The output of shift register 246 also feeds switch 248. The sum output of adder 238 feeds shift register 250 and switch 252. The output of shift register 250 also feeds switch 252. The difference output of adder 240 feeds shift register 254 and switch 256. The output of shift register 254 also feeds switch 256. Switches 244, 248, 252, and 256 are operated in synchronism at a rate of 64,000 open-close cycles per second. Switch 244 feeds multiplier 258. Switch 248 feeds multiplier 260. Switch 252 feeds multiplier 262. Switch 256 feeds multiplier 264. Plus or minus one generator 266 feeds multipliers 258, 260, 262, and 264. Multiplier 258 feeds low pass digital filter 268. Multiplier 260 feeds low pass digital filter 270. Multiplier 262 feeds low pass digital filter 272. Multiplier 264 feeds low pass digital filter 274. Filters 268, 270, 272 and 274 have high frequency cutoff of 16 KHz. Low pass digital filter 268 feeds shift register 276 and switch 278. The output of shift register 276 also feeds switch 278. The output of digital filter 270 feeds shift register 280 and switch 282. The output of shift register 280 also feeds switch 282. The output of digital filter 272 feeds shift register 284 and switch 286. The output of shift register 284 also feeds switch 286. The output of digital filter 274 feeds shift register 288 and switch 290. The output of shift register 288 also feeds switch 290. Switches 278, 282, 286 and 290 operate in synchronism at a rate of 32,000 close-close cycles per second. Shift registers 276, 280, 284 and 288 are two digital words in length.

The output of switch 278 feeds multiplier 292. The output of switch 282 feeds multiplier 294. The output of switch 286 feeds multiplier 296. The output of switch 290 feeds multiplier 298. Multipliers 292, 294, 296 and 298 are fed by plus or minus one generator 300. Generator 300 supplies 6 "plus ones" and then 2 "minus ones", sequentially and then repeats. Multiplier 292 feeds low pass digital filter 302. Multiplier 294 feeds low pass digital filter 304. Multiplier 296 feeds low pass digital filter 306. Multiplier 298 feeds low pass digital filter 308. Filters 302, 304, 306, 308 have a high frequency cutoff at 8 KHz. Digital filter 302 feeds shift register 310 and switch 312. Shift register 310 also feeds switch 312. Digital filter 304 feeds shift register 314 and switch 316. Shift register 314 also feeds switch 316. The output of Shift register filter 306 feeds shift register 318 and switch 320. Shiftregister 318 also feeds switch 320. The output of digital filter 308 feeds shift register 322 and switch 324. Shift register 322 also feeds switch 324. Switches 312, 316, 320, and 324 are operated in synchronism at a rate of 16,000 close-close cycles per second. Switch 312 feeds multiplier 326 and 328. Switch 316 feeds multipliers 330, 332. Switch 320 feeds multipliers 334, 336. Switch 324 feeds multipliers 338, 340. Multiplier 342 feeds multipliers 328, 332, 336, and 340. Multiplier 342 is fed by a sine $(\pi/2)n$ generator 344 and by plus or minus one generator 346. Generator 346 supplies 12 plus ones and then 4 minus ones, sequentially and then repeats. Cosine $(\pi/2)n$ generator 348 feeds multipliers 326, 330, 334 and 338. Multipliers 326 and 332 feed subtractor 350. Multipliers 328 and 330 feed adder 352. Multipliers 334 and 340 feed substractor 354. Multipliers 336 and 338 feed adder 356. The difference output of subtractor 350 feeds low pass digital filter 358. The sum output of adder 352 feeds low pass digital filter 360. The difference output of subtractor 354 feeds low pass digital filter 362. The sum output of adder 356 feeds low pass digital filter 364. Filters 358, 360, 362 and 364 have a high frequency cutoff of 2 KHz. Low pass digital filters 358 and 362 feed switch 366. Low pass digital filters 360 and 364 feed switch 368. Switches 366, 368 are operated in synchronism at a rate of 8,000 close-close cycles per second. Output of switch 366 feeds multiplier 370. Output of switch 368 feeds multiplier 372. Cos $(\pi/2)$m generator 371 feeds multiplier 370. Sine $(\pi/2)$m generator 373 feeds multiplier 372. Multipliers 370, 372 feed adder 374. The difference output of adder 374 feeds D to A converter 376. The output of D to A converter 376 feeds scanner 378, operating at a scanning rate of 16 × 8000 or 128,000 samples per second. Twelve of the outputs of scanner 378 feed a low pass analog filter which is typified by analog filter 380. The remaining four outputs of the scanner are not used. Filter 380 has a high frequency cutoff at 4KHz. There may be 12 such outputs from scanner 378. The output of low pass analog filter 380 is available at output terminal 382. There will be, for instance, 11 other output terminals from 11 other low pass analog filters like filter 380.

The following is a functional description of the modulator as shown in FIGS. 1(A) and 1(B). It should be understood first that the modulator is a digital system for converting up to a certain number of channels; for example, 12 baseband telephone channels each having a frequency response of approximately 300 hertz to 3700 hertz to a series of single side band supressed carrier signals dispersed in a 48 kilohertz frequency range such as from 60 kilohertz to 108 kilohertz, compatible with existing standards in telephone practice. (The demodulator provides for the conversion of similar single sideband signals to 12 baseband channels, as will be described in due course.)

FIG. 3(A) shows a spectrum representation of one of the baseband channels. Figure of 3(B) shows the composite signal containing 12 channels in a single sideband signal band. The frequencies as shown in FIG. 3 are for convenience and description. Other frequency ranges may be selected if desired. The block diagram of the modulator is shown in FIGS. 1(A) and 1(B).

The modulator accepts parallel signals from 12 telephone type channels and converts them to a composite signal represented by FIG. 3(B). The functional operation of the modulator is as follows:

Scanner 20 connects the Analog to Digital (A to D) converter 22 to each of the input channels 1–12 in sequence such that the voltage of each channel is sampled 8,000 times per second. A to D converter 22 converts all samples into binary numbers and applies the resulting numbers to quadrature signal converter 23. The A to D converter performs 96,000 conversions per second. Alternately, 12 A to D converters may be used, one for each channel located between the 12 input terminals and scanner 20.

Quadrature signal converter 23 accepts the numbers from A to D converter 22 and from them generates a series of numbers representing the waveform similar to the desired composite output signal, except that the frequency range is from 8 kilohertz to 56 kilohertz. The numbers are converted to a voltage waveform by D to A converter 140. D to A converter 140 output is applied to low pass filter 142 which removes undesired high frequency components. The resulting signal is applied to balanced mixer 144 along with the 52 kilohertz sinewave from oscillator 146 which converts the signal to the desired frequency range; which may be from 60 kilohertz to 108 kilohertz. Mixer 144 output is then high pass filtered by filter 148 to remove the image frequencies from the mixer 144 output. The operation of the circuits are as follows:

The digitized input samples are first applied to quadrature signal converter 23, shown schematically in FIG. 1A. The indicated computations of quadrature signal inverter 23 are performed independently for each of the 12 input channels using a relatively small quantity of circuitry which is time shared among the 12 input channels. The value of the mth sample of a particular input channel will be denoted by $_1x_m$. [The prefix subscript (e.g. $_1$) is used to denote a signal at a specific point in the modulator circuit.] Further, assume a sinewave of angular frequency $\omega_i$ is present at this input channel.

Thus:

$$_1x_m = A \cos(\omega_i mT + \phi)$$

(where the prefix subscript $_1$ denotes the output of A to D converter 22).
where: T = time interval between samples = (1/8000) second. (1) and define:

$$_1Z_m = {_1X_m} + j_1Y_m \quad (X \text{ is real part of } Z; Y \text{ is imaginary part of } Z.) \quad (2)$$

where:

$$_1Y_m \equiv 0 j = \sqrt{-1}$$

then:

$$_1Z_m = {_1X_m} = \frac{A}{2} [ e^{j(m\theta + \phi)} + e^{-j(m\theta + \phi)} ] \quad (3)$$

where:

$$\theta = \omega_i T$$

Further assume that the input frequency is less than 4KHz. It follows that:

$$\theta < \pi \quad (4)$$

Referring to FIG. 1A, the samples $_1x_m$ are multiplied by the real and imaginary parts of $e^{-j(\pi/2)m}$. (Cos $(\pi/2)$m and $-\sin(\pi/2)$m, respectively.)
Now define:

$$_2Z_m = {_2X_m} + j_2Y_m \quad (5)$$

(where the subscript $_2$ denotes the outputs of multipliers 24, 26.)
clearly:

$$_2Z_m = [ e^{-j\pi/2m} ] [ _1Z_m ] \quad (6)$$

and for a sine wave input, from equation (3):

$$_2Z_m = \frac{A}{2} e^{-j\pi/2m} [ e^{j(m\phi + \theta)} + e^{-j(m\phi + \theta)} ]$$

$$_2Z_m = \frac{A}{2}[e^{j\{m(\theta - \pi/2) + \phi\}} + e^{-j\{m(\theta + \pi/2) + \phi\}}] \quad (7)$$

Equation (7) gives the values of the outputs (for one channel) of the first two multipliers 24, 26 of FIG. 1(A) for a sine wave input. Consider now the nature of the spectrum of the sample signals from each channel. We define the spectrum of the data samples as the Fourier transform of a series of impulses in the time domain, each impulse having value equal to the corresponding data sample. The definition results in a spectrum which is periodic in the frequency domain of period equal to the sampling frequency. Thus, an input voltage spectrum as characterized in FIG. 3(A), produces sample data (corresponding to the $_1x_m$'s inputs in FIG. 1(A) whose spectrum is characterized in FIG. 3(C), assuming a sample rate of 8,000 samples per second. The proliferation of spectra is caused by "aliasing", a term familiar to one in the digital sampling art. The vertical lines of FIG. 3C correspond to a sine wave input as defined in the foregoing. FIG. 3(D) illustrates the spectrum of $_2Z_m = _2X_m + j_2Y_m$, see FIG. 1(A) and equation (7) above. We now generate a series of data samples at twice the original sample rate by interleaving data samples of value zero between the samples $_2Z_m$ resulting in:

$$_3Z_n = {_2Z_{n/2}} \text{ (for } n \text{ even)}$$

$$_3Z_n = 0 \text{ (for } n \text{ odd)}$$

(Where the subscript $_3$ denotes the outputs of switches 28, 30).

It follows from the foregoing definition of the spectrum of the data samples that the spectrum of $_3Z_n$ is the same as the spectrum of $_2Z_m$ as illustrated in FIG. 3(D). This is true because only zero sample values have been added. For a sine wave input, $_3Z_n$ is found from modifying equation (7) to account for the change in sample rate:

$$_3Z_n = \frac{A}{2}[e^{j\{m(\theta/2 - \pi/4) + \phi\}} + e^{-j\{m(\theta/2 + \pi/4) + \phi\}} + e^{j\{m(\theta/2 + 3\pi/2) + \phi\}} + e^{-j\{m(\theta/2 + 5\pi/4) + \phi\}}] \quad (8)$$

As shown in FIG. 1(A) the real and imaginary parts of $_3Z_n$ are low pass filtered by a digital recursive low pass filter (32, 23) with cutoff frequency of two kilohertz. In equation 8, only the first exponential term is within the pass band of the low pass filter. Consequently:

$$_4Z_n = {_4X_n} + j_4Y_n = \frac{A}{2}e^{j\{m(\theta/2 - \pi/4) + \phi\}} \quad (9)$$

(where the subscript $_4$ denotes the outputs of filters 32, 34.)

FIG. 3(E) illustrates the resulting spectrum. The four miltipliers 36, 38, 30 and 42 and two adders 44, 46 of FIG. 1(A) perform a complex multiplication by $e^{j(\pi/2)n}$, resulting in:

$$_5Z_n = {_5X_n} + j_5Y_n = [e^{j\pi/2n}][_4Z_n] \quad (10)$$

(where the subscript $_5$ denotes the outputs of adders 44, 46.)

For a sine wave input:

$$_5Z_n = \frac{A}{2}e^{j\{m(\theta 2 + \pi/4) + \phi\}} \quad (11)$$

$$= \frac{A}{2}e^{j\{m\omega_i + \pi/2T/T/2 + \phi\}} \quad (12)$$

The spectrum of $_5Z_n$ is illustrated in FIG. 3(F).

It is important to note that all of the multiplications indicated in FIG. 1(A) are multiplications by 0 or plus or minus 1. This results in considerable simplification of the hardware. The spectrum of $_5Z_n$ is easily modified to any of the three alternative forms shown in FIG. 3(G), (H) and (J). If the algebraic sign of every second sample is reversed (both real and imaginary parts), the spectrum shown in FIG. 3(G) results. Reversing signs in this manner is equivalent to multiplying $_5Z_n$ by $e^{j\pi n}$, resulting in an angular frequency shift of $$\frac{\pi}{2T}.$$

If the sign of all imaginary parts of $_5Z_n$ are reversed, thereby forming the complex conjugate, the spectrum shown in FIG. 3(H) is obtained. This is equivalent to reflection of FIGS. 3(F) about the zero frequency axis. Reversing signs of alternate samples and further reversing signs of all $_5Y_n$ results in the spectrum illustrated in FIG. 3(J).

To combine the 12 channels to achieve the desired output spectrum the first step is to combine channel pairs as follows:

The output samples of the quadrature signal converter 23 for input channel 2 is converted to the spectrum shown in FIG. 3(G) by reversing signs of alternate samples. The resulting numbers are added to the corresponding samples for channel 1 whose spectrum is represented by FIG. 3(F). The spectrum after addition of channels 1 and 2 is shown in FIG. 3(K). The same operation is performed on channels 3 and 4, 5 and 6, etc.

The sample rate for each channel pair is doubled again by interleaving samples of value zero in switches 66, 68, and the resulting samples are low pass filtered by a digital recursive filter 70, 72 yielding the spectrum shown in FIG. 3(L). The signs of the resulting samples for channel pairs 3 and 4 are reversed on alternate samples in multipliers 74, 76, giving the spectrum shown in FIG. 3(M), and the samples are added to corresponding samples for channel pair 1 and 2 by a one word delay in shift registers 86, 88. The resulting spectrum is shown in FIG. 3(N). In a similar manner, channels 5, 6, 7 and 8 are combined with channels 1, 2, 3 and 4 giving the spectrum shown in FIG. 3(P).

The next step (see FIG. 1(B)) is to shift the spectrum 2 kilohertz lower in frequency by multiplying the samples by $e^{-j}(\pi/16)i$ in multipliers 98, 102, 100, 104, (sin $(\pi/16)i$ and cos $(\pi/16)i$), and subtractors 114, 116. Assume that there are 16 input channels rather than 12. Channels 9 through 16 are similarly shifted 2 kilohertz higher in frequency by multiplying by $e^{j}(\pi/16)i$, and added to channels 1 through 8 resulting in the spectrum shown in FIG. 3(Q), where channels 5, 6, 16 and 14 are not used. The sample rate is then doubled by switches 126, 128; the resulting sample is low pass filtered in filters 130, 132 and the spectrum shifted 32 kilohertz higher in frequency by multiplying $e^{j}(\pi/2)k$ (±1 generator and multiplier 136) and the imaginary part of the sample is discarded (in fact the imaginary part is not computed). The real part of the sample is the output of multiplier 136. The spectrum of the real part of the results is shown in FIG. 3(R). These samples are converted to a voltage waveform by the D to A converter 140 the output of which is up converted to the desired frequency range by a balanced mixer comprising mixer 144 and oscillator 146 feeding a high pass analog filter 148. The output of this filter is available at output terminal 150 for transmission on conventional telephone transmission systems (not shown).

It will be clear to one skilled in the art that other combinations of baseband channels could be made using the same or similar operations as described above.

The functional description of the demodulator follows. The reader is referred to FIGS. 2(A) and 2(B), showing the block diagram of the demodulator. The techniques used are similar to those used in the modulator, except that the operations are performed more or less in reverse order. The signal processing steps are as follows:

1. The composite input signal from the telephone transmission system is converted to the frequency range 8 kilohertz to 56 kilohertz by balanced mixer 201 and oscillator 202.

2. The resulting waveform is sampled and converted to binary numbers by A to D converter 206 at a sample rate of 128,000 samples per second.

3. The spectrum of the samples is shifted lower in frequency by complex multiplication by $e^{j}(\pi/2)k$ (cos $(\pi/2)k$, sin $(\pi/2)k$) in multipliers 208, 210. The result is low pass filtered in filters 215, 216 to retain the signal components between −32 kilohertz and +32 kilohertz, while removing components between +32 kilohertz and +96 kilohertz.

4. The sample of the resulting data is halved to 64,000 samples per second by discarding alternate samples in switches 218, 220.

5. Two data sequences are generated by multiplying the samples by $e^{j}(\pi/16)k$ and $e^{-j}(\pi/16)k$ (cos $(\pi/16)k$ and sin $(\pi/16)k$).

6. Each resulting sequence is converted to two sequences, the second obtained by reversing signs in multipliers 258, 260, 262, 264 using plus or minus one generator 266 and delaying of samples in shift registers 242, 246, 250, 254 and switches 244, 248, 252, 256.

7. The four resulting sequences are low pass filtered with a cutoff frequency of 16 kilohertz in filters 268, 270, 272, 274. The sample rate is again halved by discarding alternate samples in switches 278, 282, 286, 290.

8. Steps 6 and 7 are repeated with a filter cut off frequency of 8 kilohertz.

9. From the 8 resulting data sequences, sixteen are generated by multiplying $e^{j}(\pi/2)n$ and $e^{-j}(\pi/2)n$ (cos $(\pi/2)n$ and sin $(\pi/2)n$) respectively.

10. Each of the 16 sequences is low pass filtered with cutoff frequency being 2 kilohertz in filters 358, 360, 362, 364. The sample rate is again halved by discarding alternate samples in switches 366, 368.

11. Each sequence is multiplied by $e^{j}(\pi/2)m$ (cos $(\pi/2)m$ and sin $(\pi/2)m$ and the imaginary part of the result is discarded. Twelve of the resulting 16 sequences are converted to voltage waveforms by D to A converter 376.

12. The D to A converter output is descanned to provide 12 output channel signals. Each of these signals is low pass filtered by filters like filter 380 to remove unwanted high frequency components.

The digital filters utilized throughout the system of the invention may be easily configured to adapt to time sharing of the hardware among several channels.

Assuming that serial arithmetic elements are used, the required clock rate for the logic of the system of the invention is estimated to be approximately 2 megabits per second.

In the preferred embodiment of the invention, the low pass digital filters of FIG. 2 are made up to two pole two zero sections. In applications requiring a high degree of phase linearity versus frequency, additional two pole two zero sections can be added to those used, to provide phase equalization to an abritarily high degree.

Various other modifications and changes may be made to the present invention from the principles of the invention described above without departing from the spirit and scope thereof as encompassed in the accompanying claims.

What is claimed is:

1. A communications system for multiplexing and demultiplexing a plurality of space division channel signals comprising:
   modulating means having an output signal, further comprising,
   means for sampling the plurality of space division channel signals to sequentially supply samples of said channel signals;
   first means for digitizing said sequential samples of said channel signals;
   first means for converting said digitized samples of said channel signals to frequency division multiplex signals according to a predetermined mathematical algorithm utilizing sine and cosine function multipliers having only values of −1, 0 and +1;
   second means for converting said frequency division multiplex signals to analog signals;
   first means for frequency converting said analog signals to a higher predetermined output signal frequency range;
   demodulating means, further comprising;
   means for receiving and frequency converting said signals of higher frequency range to a predetermined lower frequency range;
   second means for digitizing said signals of lower frequency range;
   third means for converting said digitized lower frequency signals into a plurality of of digitized space division channel signals according to a predetermined mathematical algorithm utilizing sine and cosine function multipliers having only values of −1, 0 and +1;
fourth means for converting said digitized space division channel signals to analog signals, and
transmitting means for communicating said modulating means output signal to said demodulating means.

2. The system according to claim 1 wherein said sampling is accomplished at a sampling rate equal to at least twice the highest frequency component included in any of said plurality of space division channel signals.

3. The system according to claim 2 wherein said third means for converting said digitized lower frequency signals includes:
means for descanning said plurality of digitized space division channel signals at a rate equal to said sampling rate.

4. The system according to claim 1 wherein said first means for converting said digitized samples includes:
means for multiplying said digitized sample signals by the real and by the imaginary parts of the term $e^{-j}(\pi/x)m$ where m is an integer which is incremented by one for each completed sequence of said samples and x is an integral power of 2.

5. The system according to claim 4 wherein said first means for converting said digitized samples includes:
means for aliasing to generate a frequency diverse series of otherwise identical channel signals; and
means for digitally filtering said frequency diverse channel signals to select only predetermined ones of them.

6. Apparatus for converting a plurality of space division channel signals to a frequency division multiplexed signal wherein the space division channel signals are scanned to provide sequential samples, comprising:
means for digitizing the sequential samples of said channel signals;
first means for converting said digitized samples of said channel signals to the frequency division multiplexed signal according to a predetermined mathematical algorithm utilizing sine and cosine function multipliers having only the values −1, 0 and +1;
second means for converting said frequency division multiplexed signal to analog signals; and
means for frequency converting said analog signals to a predetermined higher frequency range.

7. Apparatus for converting a frequency division multiplex signal to a plurality of space division channel signals comprising:
means for frequency converting the frequency division multiplexed signal to a predetermined lower frequency range;
means for digitizing said lower frequency division multiplex signal;
first means for converting said frequency converted digitized frequency division multiplex signals to a plurality of digitized space division channel signals according to a predetermined mathematical algorithm utilizing sine and cosine function multipliers having only values of −1, 0 and +1; and
second means for converting said digitized space division channel signals to like analog signals.

8. A method of modulating and demodulating a plurality of space division channel baseband signals in a frequency division multiplexing transmission system wherein the baseband signals are scanned to provide sequential samples at a rate equal to at least twice the highest frequency component contained in any baseband signal, comprising the steps of:
digitizing the baseband signal samples;
processing the digitized baseband signal samples in a digital signal processor according to a predetermined mathematical algorithm utilizing sine and cosine function multipliers having only values of −1, 0 and +1 to provide a digital representation of a frequency division multiplex signal in a predetermined frequency range;
converting the processed signal samples to analog signals in a desired frequency range;
transmitting said analog signals;
converting said transmitted analog signals to a predetermined frequency range;
digitizing the converting analog signals;
processing the digitized signals in a digital signal processor according to a predetermined mathematical algorithm utilizing sine and cosine function multipliers having only values of −1, 0 and +1 to provide a plurality of digital baseband signals;
converting said plurality of digital baseband signals to analog signals;
descanning said analog signals to provide a sequential series of analog signals; and
filtering said sequential series of analog signals to provide the plurality of space division baseband channel signals.

9. A method of modulating a plurality of space division baseband channel signals in a frequency division multiplexed transmission system wherein the signals are scanned to provide sequential samples at a rate equal to at least twice the highest frequency component contained in any baseband channel signal, comprising the steps of:
digitizing the baseband signal samples;
processing the digitized baseband signal samples in a digital signal processor according to a predetermined mathematical algorithm utilizing sine and cosine function multipliers having only values of −1, 0 and +1 to provide a digital representation of a frequency division multiplex signal in a predetermined frequency range; and
converting the processed signal samples to analog signals in a desired frequency range.

10. A method of demodulating an analog frequency division multiplexed signal from a transmission system, comprising the steps of:
converting said transmitted analog signals to a predetermined frequency range;
digitizing the converted analog signals;
processing the digitized signals in a digital signal processor according to a predetermined mathematical algorithm utilizing sine and cosine function multipliers having only values of −1, 0 and +1 to provide a plurality of digital baseband signals;
converting said plurality of digital baseband signals to analog signals;
descanning said analog signals to provide a sequential series of analog signals; and
filtering said sequential series of analog signals to provide the plurality of space division baseband channel signals.

11. The system according to claim 1 wherein said predetermined mathematical algorithm comprises a plurality of sampling rates according to a predetermined schedule of said sampling rates wherein said sampling rates are related by ratios of integral powers of two, thereby allowing sine and cosine multiplication factors of said mathematical algorithm to take values of plus one, minus one and zero.

12. The system according to claim 6 wherein said predetermined mathematical algorithm comprises the use of a plurality of sampling rates according to a predetermined schedule of said sampling rates wherein said sampling rates are related by ratios of integral powers of two, thereby allowing sine and cosine multiplication factors of said mathematical algorithm to take values of plus one, minus one and zero.

13. The system according to claim 7 wherein said predetermined mathematical algorithm comprises the use of a plurality of sampling rates according to a predetermined schedule of said sampling rates wherein said sampling rates are related by ratios of integral powers of two, thereby allowing sine and cosine multiplication factors of said mathematical algorithm to take values of plus one, minus one and zero.

14. The system according to claim 6 wherein said first means for converting includes:
 means for aliasing to generate a frequency diverse series of otherwise identical channel signals; and
 means for digitally filtering said frequency diverse channel signals to select only predetermined ones of them.

15. The system according to claim 7 wherein said first means for converting includes:
 means for aliasing to generate a frequency diverse series of otherwise identical channel signals; and
 means for digitally filtering said frequency diverse channel signals to select only predetermined ones of them.

* * * * *